Patented Aug. 4, 1942

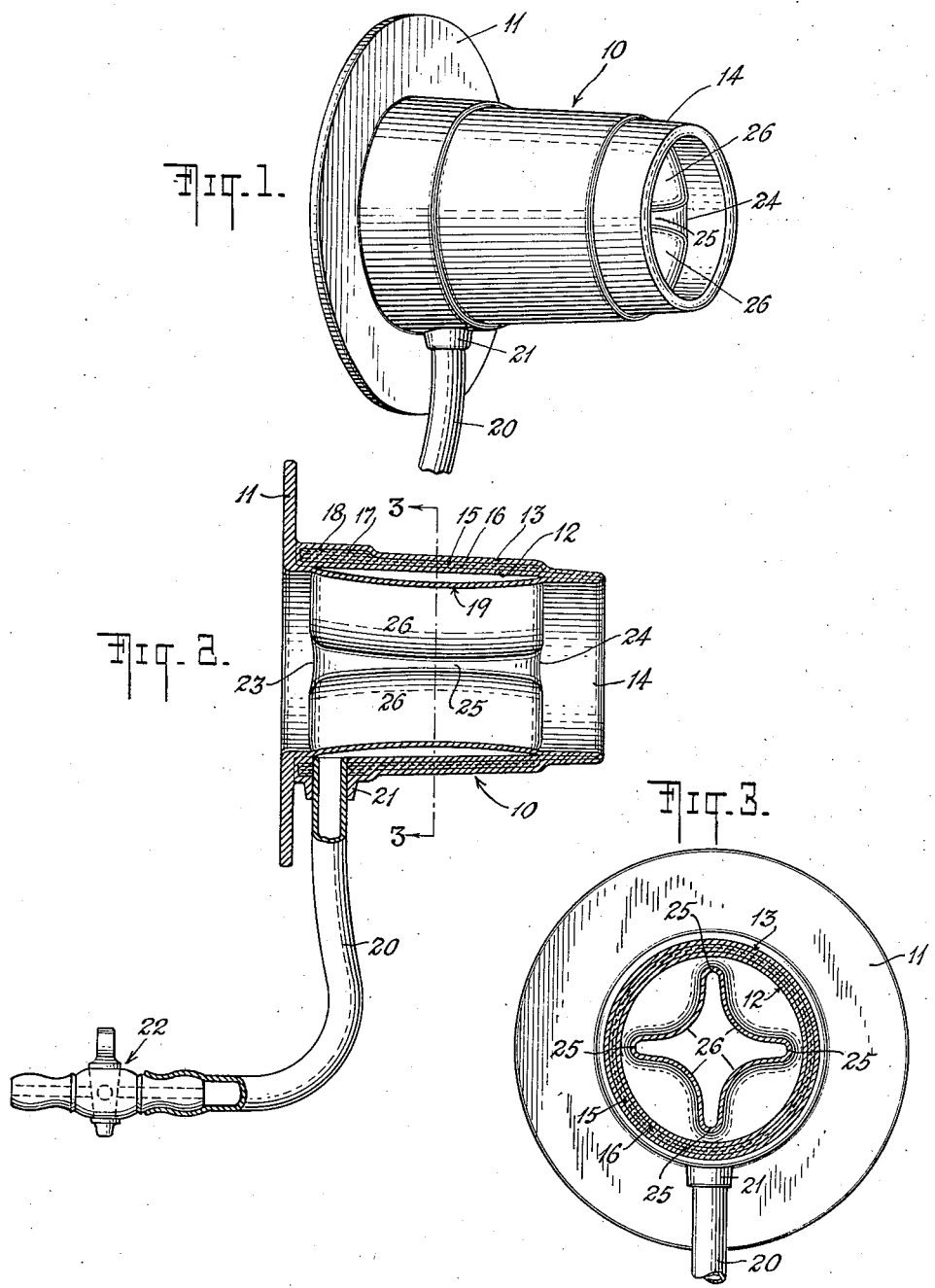

2,291,785

UNITED STATES PATENT OFFICE 2,291,785

SURGICAL DEVICE

Adolph Baudistel, East Orange, N. J.

Application June 13, 1941, Serial No. 397,872

4 Claims. (Cl. 128—299)

This invention relates to surgical equipment and has for its principal object the provision of an improved surgical device for use in controlling the flow of blood in an appendage of the body to accomplish certain results.

The advantages of the device as well as the features of novelty thereof will become apparent after a perusal of the following description read in connection with the accompanying drawing, in which Fig. 1 is a perspective side view of the device, Fig. 2 is a longitudinal sectional view of the device and Fig. 3 is a sectional view taken along the line 3—3 of Fig. 2, the device in all said figures being shown partially inflated.

In the drawing, the numeral 10 indicates generally the body of the device which has a tubular frusto-conical shape, the inside diameter of the body 10 being greater at the end to which the external flange 11 is attached than at its other end. The body 10 is a composite structure composed of inner and outer walls 12 and 13, respectively, made of relatively thin sheets of stretchable, flexible rubber, the interior surface of the inner wall 12 presenting no apparent seam and being entirely smooth. The two walls 12 and 13, which are spaced apart for substantially their entire length, are integrally or permanently joined together in any suitable manner at the outer end portion of the device to form a ring-shaped portion 14 which is flexible and stretchable in directions both longitudinally and transversely of the device. The other ends of the walls 12 and 13 are integrally formed with the flange 11 which is likewise made of rubber that is both flexible and stretchable but which has a thickness greater than that of the walls 12 and 13. Intermediate the walls 12 and 13, from the inner end of the ring-shaped portion 14 to the flange 11, are a plurality of layers 15 and 16 of fabric material so woven as to provide minute spaces between the threads. The rubber walls 12 and 13 and the fabric layers 15 and 16 are bonded together by a rubber adhesive which penetrates and extends through the spaces in the fabric layers. The end portion of the body 10 to which the flange 11 is attached is further strengthened by two additional narrow strips of fabric of a like nature. These additional strips or narrow layers are designated 17 and 18 on the drawing and are bonded to the rubber walls 12 and 13 and to the fabric layers 15 and 16 by rubber adhesive. It will therefore be seen that the body 10 is so constructed that it may be readily flexed or distorted, the yieldability of the body to distortion being greatest in the region of the outer ring-shaped portion 14 and least at its other end portion in the ring-shaped region encompassed by the narrow layers of fabric 17 and 18. By reason of the fact that the several walls or layers of which the body is constituted are bonded by a rubber adhesive, the body 10 can be readily distorted from its normal shape without danger of such walls or layers becoming separated, such bond being strong and lasting due to the substantial integral character of the rubber adhesive from rubber wall 12 to rubber wall 13. It will also be seen, that due to the fabric layers 15, 16, 17 and 18 the only portion of the body 10 which has any appreciable stretch is the outer ring-shaped portion 14, the remainder of the body while being quite flexible and readily yielding to distortion, being substantially rigid against forces tending to stretch it either in a longitudinal or transverse direction.

Concealing the entire inner wall 12 of the body 10, is an inner wall or lining 19 made of a relatively thin sheet of flexible and stretchable rubber. The lining 19 is permanently secured in any suitable manner to the walls 12 and 13 of the body 10 in the region of the ring-shaped portion 14 and for substantially the entire area of such ring-shaped portion, the outer ends of the combined walls 12, 13 and 19 being formed to present a smooth, rounded outer edge. The lining 19 is also permanently bonded to or integrally formed with the rubber material of the flange 11 and the other end of inner wall 12, as is shown more clearly in Fig. 2 of the drawing. Thus there is presented between lining 19 and the inner wall 12 of the body a sealed, annularly-shaped chamber into which air may be delivered through the medium of hose 20. The hose which is constituted of a short piece of flexible rubber tubing extends through the body 10 in the region thereof encompassed by the fabric layers 17 and 18. The terminal end of the hose 20 is substantially flush with the interior surface of the inner wall 12 and the adjoining end portion thereof is secured to the body by the rubber adhesive and a nipple 21 integral with the outer wall 13 of the body 10. The other end of the hose 20 is provided with a valve 22 for trapping air inside the unit and to which may be attached a second length of hose leading to a source of air supply.

In the normal deflated condition of the lining 19, the unattached portion thereof has a frusto-conical shape and is co-axial with the inner wall 12 of the body 10. As air is forced into the chamber formed by the lining 19, the latter, due to the non-stretchability of the body 10, expands inwardly. At four spaced points, at each end of the unattached portion of lining 19, such unattached portion is foreshortened by adhesively connecting such lining to the inner wall 12, as at the points designated 23 and 24 in Fig. 2 of the drawing, to provide four spaced longitudinally extending portions 25 of the lining 19 having a length less than the lengths of the intermediate portions 26 of such lining. Thus the portions 25 have a greater resistance to stretch than the portions 26 and as a consequence, when air is forced into the chamber formed by the lining 19, the portions 26 will bulge inwardly, as is shown more clearly in Fig. 3 of the drawing, to form four rounded prominences extending longitudinally of the unit and characterized by the smooth curvature of their exterior surfaces.

It will be evident from the foregoing that when the device is applied to the appendage of the body to be treated, it is in a deflated condition. Inasmuch as the body 10 is substantially non-stretchable, it is formed to have an interior configuration greater than the configuration of the appendage to which it is to be attached. When the device is in place on the appendage with the flange 11 thereof in contact with the portion of the body to which the appendage is connected, air is forced into the chamber formed by the lining 19 to cause the portions 26 of such lining to expand in the manner hereinabove described and exert an intense, soft pressure on the appendage under treatment. The air during its passage into the chamber passes freely between the inner wall 12 of the body 10 and the portions 25 of the lining 19 so that the pressure of air in all of the expanded portions 26 will be substantially the same and such portions will expand to the same degree. Due to the form of the expanded portions 26, the effect is to eliminate complete circumferential constriction of the appendage under treatment. Thus at the root or place of connection of the appendage with the body, the effect is to permit the arterial blood to flow into the appendage while shutting off to a much greater extent the venous connection for the arteries of such appendage, the reduction of the flow of blood in the venous connection being as much as eighty-five percent or just short of complete constriction so that there is built up in the appendage a substantially greater blood pressure than would be present under normal conditions. It will also be evident that the device can be readily applied to the appendage being treated and will function to support and steady such appendage.

I claim:

1. A surgical device of the type described, comprising a tubularly-shaped body portion capable of being distorted from its normal condition and including an outer end portion made of stretchable rubber material, an intermediate portion and an inner end portion of less flexibility than said intermediate portion, an external flange of flexible material permanently secured to the inner end portion of said body, an inner wall connected at one end to the outer end portion of said body and at its other end to the inner end portion of the body so as to provide a tubularly-shaped air chamber, a conduit extending through the inner end portion of the body and communicating with said air chamber, said inner wall being made of stretchable rubber material so that when air is forced into said chamber said inner wall expands into the central opening of the device, and means restricting the expansion of a plurality of spaced longitudinally extending portions of said inner wall whereby the unrestricted portions thereof form a plurality of rounded longitudinally extending prominences projecting inwardly towards the longitudinal axis of the device and spaced by said restricted longitudinally extending portions of said inner wall.

2. A device such as is defined in claim 1, in which the intermediate and inner end portions of the body are composed of inner and outer walls of rubber material and interior layers of fabric material woven to provide spaces intermediate the threads thereof and rubber adhesive penetrating the spaces of said fabric layers and binding said fabric layers and said inner and outer walls permanently together, whereby the intermediate and inner end portions of the body are substantially non-stretchable.

3. A device such as is defined in claim 1, in which the body of the device is frusto-conically shaped and in which the intermediate and inner end portions of the body are composed of inner and outer walls of rubber material and interior layers of fabric material woven to provide spaces intermediate the threads thereof, at least some of said fabric layers extending for the combined lengths of said intermediate and inner end portions of the body and some of such layers surrounding the inner end portion only of the body, and rubber adhesive penetrating the spaces of all of said fabric layers and binding said fabric layers and said inner and outer walls permanently together, whereby the intermediate and inner end portions of the body are substantially non-stretchable and said inner end portion has a greater resistance to distortion than said intermediate portion.

4. A device such as is defined in claim 1, in which said inner stretchable wall has a length equal to the length of the device and in which the unattached portion thereof forming the air chamber has a length less than the combined length of the inner end and intermediate portions of the body, the spaced restricted longitudinally extending portions of said inner wall being shorter in length and in width than the portions thereof forming the longitudinally extending prominences.

ADOLPH BAUDISTEL.